US012782773B2

(12) United States Patent
Kim et al.

(10) Patent No.: US 12,782,773 B2
(45) Date of Patent: Nov. 3, 2026

(54) PLANAR LIGHTING DEVICE

(71) Applicant: LG ELECTRONICS INC., Seoul (KR)

(72) Inventors: Yongjin Kim, Seoul (KR); Munheon Hong, Seoul (KR); Chilkeun Park, Seoul (KR); Sangcheon Kim, Seoul (KR); Mangeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/349,693

(22) Filed: Oct. 3, 2025

(65) Prior Publication Data

US 2026/0044039 A1 Feb. 12, 2026

Related U.S. Application Data

(63) Continuation of application No. 18/826,640, filed on Sep. 6, 2024, now Pat. No. 12,493,214, which is a (Continued)

(30) Foreign Application Priority Data

Jan. 23, 2013 (KR) ........................ 10-2013-0007294

(51) Int. Cl.
*G02F 1/13357* (2006.01)
*F21V 7/00* (2006.01)
(Continued)

(52) U.S. Cl.
CPC .......... *G02F 1/133606* (2013.01); *F21V 7/00* (2013.01); *F21V 7/0025* (2013.01); (Continued)

(58) Field of Classification Search
CPC ..... F21K 9/60; F21V 7/04; F21V 7/10; F21V 9/00; G02F 1/1336; F21Y 2105/10; F21Y 2115/10; H10H 29/142
See application file for complete search history.

(56) References Cited

U.S. PATENT DOCUMENTS

2007/0147048 A1* 6/2007 Guo ........................ F21V 13/12 362/341
2011/0051411 A1 3/2011 Kim et al.
(Continued)

FOREIGN PATENT DOCUMENTS

KR 20110045636 A * 5/2011 ........... G02B 6/0061

OTHER PUBLICATIONS

English translation of KR-20110045636-A (Year: 2011).*

*Primary Examiner* — Evan P Dzierzynski
(74) *Attorney, Agent, or Firm* — Birch, Stewart, Kolasch & Birch, LLP

(57) ABSTRACT

A display device including a lower cover, a liquid crystal panel, and a backlight unit disposed between the liquid crystal panel and the lower cover and providing light to the liquid crystal panel, wherein the backlight unit includes a circuit substrate disposed on an upper surface of the lower cover, a first adhesive disposed between a lower surface of the circuit substrate and the upper surface of the lower cover, a light source mounted on an upper surface of the circuit substrate, and a reflection layer disposed on the circuit substrate, and the first adhesive is positioned behind the light source.

17 Claims, 19 Drawing Sheets

Related U.S. Application Data continuation of application No. 17/974,097, filed on Oct. 26, 2022, now Pat. No. 12,111,538, which is a continuation of application No. 17/569,919, filed on Jan. 6, 2022, now Pat. No. 11,513,390, which is a continuation of application No. 17/186,768, filed on Feb. 26, 2021, now Pat. No. 11,249,344, which is a continuation of application No. 16/806,480, filed on Mar. 2, 2020, now Pat. No. 10,962,833, which is a continuation of application No. 16/218,816, filed on Dec. 13, 2018, now Pat. No. 10,613,383, which is a continuation of application No. 15/351,136, filed on Nov. 14, 2016, now Pat. No. 10,185,178, which is a continuation of application No. 14/992,768, filed on Jan. 11, 2016, now Pat. No. 9,494,824, which is a continuation of application No. 14/161,284, filed on Jan. 22, 2014, now Pat. No. 9,482,897.

(51) Int. Cl.

| | |
|---|---|
| ***F21V 11/16*** | (2006.01) |
| *F21V 8/00* | (2006.01) |
| *F21Y 105/00* | (2016.01) |
| *G02F 1/1333* | (2006.01) |
| *G02F 1/1335* | (2006.01) |

(52) U.S. Cl.

CPC ........ *F21V 11/16* (2013.01); *G02F 1/133603* (2013.01); *G02F 1/133605* (2013.01); *G02F 1/133611* (2013.01); *F21Y 2105/00* (2013.01); *G02B 6/0055* (2013.01); *G02B 6/0061* (2013.01); *G02B 6/0096* (2013.01); *G02F 1/133388* (2021.01); *G02F 1/133612* (2021.01); *G02F 1/133613* (2021.01); *G02F 1/133614* (2021.01); *G02F 2202/28* (2013.01)

(56) References Cited

U.S. PATENT DOCUMENTS

| | | | | |
|---|---|---|---|---|
| 2011/0261286 A1 | | 10/2011 | Choi et al. | |
| 2011/0273880 A1* | | 11/2011 | Sanpei | F21K 9/68 362/235 |
| 2011/0305004 A1 | | 12/2011 | Kim et al. | |
| 2012/0120656 A1* | | 5/2012 | Ajichi | G02F 1/133603 362/235 |
| 2012/0170253 A1 | | 7/2012 | Park et al. | |

* cited by examiner

PLANAR LIGHTING DEVICE

CROSS-REFERENCE TO RELATED APPLICATIONS

This Application is a Continuation of U.S. patent application Ser. No. 18/826,640 filed on Sep. 6, 2024 (now U.S. Pat. No. 12,493,214 issued on Dec. 9, 2025), which is a Continuation of U.S. patent application Ser. No. 17/974,097 filed on Oct. 26, 2022 (now U.S. Pat. No. 12,111,538 issued on Oct. 8, 2024), which is a Continuation of U.S. patent application Ser. No. 17/569,919 filed on Jan. 6, 2022 (now U.S. Pat. No. 11,513,390 issued on Nov. 29, 2022), which is a Continuation of U.S. patent application Ser. No. 17/186,768 filed on Feb. 26, 2021 (now U.S. Pat. No. 11,249,344 issued on Feb. 15, 2022), which is a Continuation of U.S. patent application Ser. No. 16/806,480 filed on Mar. 2, 2020 (now U.S. Pat. No. 10,962,833 issued on Mar. 30, 2021), which is a Continuation of U.S. patent application Ser. No. 16/218,816 filed on Dec. 13, 2018 (now U.S. Pat. No. 10,613,383 issued on Apr. 7, 2020), which is a Continuation of U.S. patent application Ser. No. 15/351,136 filed on Nov. 14, 2016 (now U.S. Pat. No. 10,185,178 issued on Jan. 22, 2019), which is a Continuation of U.S. patent application Ser. No. 14/992,768 filed on Jan. 11, 2016 (now U.S. Pat. No. 9,494,824 issued on Nov. 15, 2016), which is a Continuation of U.S. patent application Ser. No. 14/161,284 filed on Jan. 22, 2014 (now U.S. Pat. No. 9,482,897 issued on Nov. 1, 2016), which claims the priority benefit under 35 U.S.C. § 119 (a) to Korean Patent Application No. 10 2013 0007294 filed in the Republic of Korea on Jan. 23, 2013, all of which are hereby expressly incorporated by reference into the present application.

BACKGROUND OF THE INVENTION

Field of the Invention

The present invention relates to a planar lighting device and more particularly, to a planar lighting device including a light emitting device.

Discussion of the Related Art

Liquid crystal displays (LCDs) which are one type of displays are used in a variety of monitors for televisions, notebook computers and desktops as well as cellular phones.

Such an LCD does not self-emit light, thus requiring a light-emitting device to light a liquid crystal panel so as to display image information.

A light emitting device of LCDs is bonded to a rear surface of a liquid crystal panel and is thus referred to as a backlight unit. This backlight unit forms a uniform surface light source and supplies light to a liquid crystal panel.

A light emitting diode (LED) has a structure in which an n-type semiconductor layer, a light-emitting layer and a p-type semiconductor layer are stacked in a substrate and an electrode is formed on the p-type semiconductor layer and the n-type semiconductor layer. Regarding a principle of light generation by the light emitting diode, light of the light-emitting layer generated upon recombination between holes and electrons injected from respective semiconductor layers is discharged to the outside.

Such a light emitting diode constitutes a light emitting diode package which is used as a light source of a backlight unit (BLU).

Such a backlight unit provides a planar light source toward the liquid crystal panel, which is thus considered to be an example of a planar lighting device. The planar lighting device is considered to be a light source which uniformly emits light through a flat surface and has a relatively small thickness.

The planar lighting device improves luminous efficacy of a display device and accomplishes structural slimness thereof.

When the light emitting diode is used as a light source of a planar lighting device, the light emitting diode may be a side type in which light is diffused to a side direction or a direct type in which light is emitted in a front direction. A method for uniformly diffusing light emitted from the light emitting diode is required.

SUMMARY OF THE INVENTION

Accordingly, the present invention is directed to a planar lighting device that substantially obviates one or more problems due to limitations and disadvantages of the related art.

An object of the present invention is to provide a direct-type planar lighting device which improves an edge luminance uniformity of the planar lighting device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a planar lighting device includes a plurality of light sources arranged on a first surface of a circuit substrate, the light sources mounted thereon, a light regulator disposed in an edge of the first surface, the light regulator regulating luminance difference caused by difference in distance between a plurality of light sources close to the edge, and an optical sheet disposed on the light sources.

The light regulator may include one or more reflectors for reflecting light emitted from the light sources to an inside or an upper part of an area defined by the first surface.

The reflectors may be discontinuously disposed in portions of the edge far from the light sources.

The reflectors may be discontinuously disposed in portions of the edge corresponding to areas between adjacent light sources close to the edge.

Each reflector may include a reflection plate or a reflection structure contacting the edge.

The reflection plate or the reflection structure may have a curved cross-sectional shape including a semi-circular, oval or circular arc shape or a polygonal cross-sectional shape including a triangular or trapezoidal shape.

The reflector may include a reflection layer disposed along the edge, and a plurality of through holes provided in the reflection layer.

The through holes may change in size according to positions relative to the light sources.

The light regulator may include one or more absorbers for absorbing light emitted from the light sources.

The absorbers may be discontinuously disposed in portions of the edge corresponding to areas between light sources close to the edge.

The light regulator may include a plurality of reflectors for reflecting light emitted from the light sources to an inside or an upper part of an area defined by the first surface, and one or more absorbers disposed between the reflectors.

The reflection layer may be disposed on the first surface.

The light regulator may be formed by bending the reflection layer.

Meanwhile, the light regulator may be provided at least one side of four edges of the first surface.

In accordance with another aspect of the present invention, a planar lighting device includes a plurality of light sources mounted on a first surface of a circuit substrate such that the light sources are spaced apart by a predetermined distance, a light regulator discontinuously disposed in at least one portion of an edge of the first surface, the light regulator regulating luminance difference caused by difference in distance between a plurality of light sources close to the edge by reflecting or absorbing light, and an optical sheet disposed on the light sources.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Reference will now be made in detail to the specific embodiments of the present invention, examples of which are illustrated in the accompanying drawings.

However, the present invention allows various modifications and variations and specific embodiments thereof will be exemplified with reference to drawings and be described in detail. The present invention should not be construed as limited to the embodiments set forth herein and includes modifications, variations, equivalents, and substitutions compliant with the spirit or scope of the present invention defined by the appended claims.

It will be understood that when an element such as a layer, area or substrate is referred to as being "on" another element, it can be directly on the element, or one or more intervening elements may also be present therebetween.

In addition, it will be understood that although terms such as "first" and "second" may be used herein to describe elements, components, areas, layers and/or regions, the elements, components, areas, layers and/or regions should not be limited by these terms.

Figure 1:
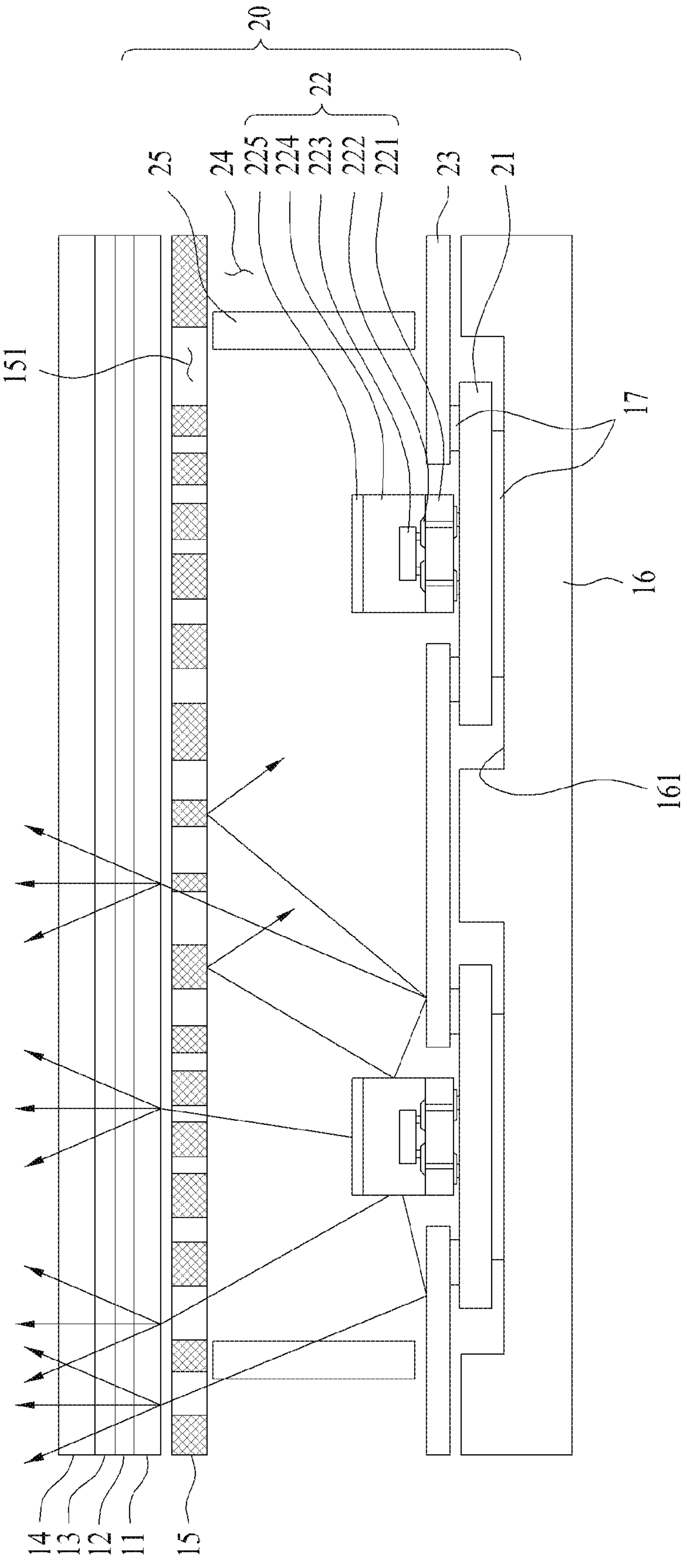
FIG. 1 is a sectional view illustrating an example of a planar lighting device.

FIG. 1 is a sectional view illustrating an example of a planar lighting device.

The planar lighting device 20 may be disposed on a lower cover 16 and a liquid crystal panel (not shown) may be disposed on the planar lighting device 20.

The planar lighting device 20 includes a plurality of light sources 22 mounted respectively on a plurality of circuit substrates 21 disposed in an upper part of the lower cover 16. Each light source 22 may be mounted by surface-mounting a light emitting diode (LED) package on the circuit substrate 21.

The light source 22 including the light emitting diode (LED) package includes a pair of electrodes 222 passing through a sub-mount substrate 221, an LED 223 connected to and mounted on the electrode 222, and a phosphor layer 224 containing a silicone resin mixture disposed outside the LED 223.

The phosphor layer 224 may have a planarized upper surface and the phosphor layer 224 may be provided on the upper surface with an optical layer 225 having optical property such as reflectivity or transmittance.

The optical layer 225 may be formed of a material prepared by mixing a resin with phenyl propanol amine (PPA), epoxy molding compound (EMC), micro-cell polyethylene terephthalate (MCPET), silver (Ag) and aluminum (Al) having reflectivity, and a bead of Ti, Al, Ag, $SiO_2$ or the like, exhibiting reflectivity, transmittance or refraction.

Light emitted upward from the LED 223 through the optical layer 225 is reflected in a side direction of the phosphor layer 224. The LED 223 is a blue LED and the phosphor material constituting the phosphor layer 224 is a yellow phosphor, thus rendering white light to be emitted from the light source 22.

The circuit substrate 21 on which the light source 22 is mounted may be disposed on a mount groove 161 disposed on the upper surface of the lower cover 16. In addition, a plurality of mount grooves 161 including the mount groove 161 may be spaced from one another by a predetermined distance and circuit substrates 21 including the circuit substrate 21 disposed respectively in the mount grooves 161 may be also spaced from one another by a predetermined distance. Accordingly, the light sources 22 may be spaced from one another by a predetermined distance on the lower cover 16.

The light sources 22 may be disposed in one line or a zigzag form.

A reflection layer 23 may be disposed in a gap between the light sources 22 disposed on the circuit substrates 21. Accordingly, the light sources 22 protrude from an upper surface of the reflection layer 23.

In addition, a transmission regulation layer 15 having a pattern of holes 151 transmitting light, which is spaced from the reflection layer 23 by a predetermined distance, may be disposed on the reflection layer 23.

The transmission regulation layer 15 may utilize a reflective sheet which transmits some of light emitted from the light source 22 and reflects the remaining light again.

The transmission regulation layer 15 is a hole patterned reflective sheet having a plurality of holes 151 on an upper surface thereof. That is, light discharged from the light source 22 through the holes 151 or reflected by the reflection layer 23 passes through the holes 151, and light travelling in other regions is reflected to the reflection layer 23 again or is refracted or reflected by a spacer 30.

In addition, radiuses of the holes 151 increase with increasing distance from a center of the light source 22, thus passing more light than is reflected with increasing distance from the light source 22.

That is, the holes 151 are disposed such that the size of the holes 151 is the smallest in the closest position to the light source 22 and is the largest in the middle between two adjacent light sources 22.

In addition, the holes 151 are disposed such that sizes of the holes 151 gradually increase from the closest position to the light source 22 to the middle position between two adjacent light sources 22 and decrease from the middle position between the two adjacent light sources 22 to the closest position to the light source 22.

The reason for this is that intensity of light increases as the light source becomes closer to the light source 22 and decreases as the light source becomes farther from the light source 22. Preferably, light transmission increases as a distance from the light source 22 increases and decreases as the distance from the light source 22 decreases so that luminance of light is uniformly maintained throughout the entire surface of a display using such a planar lighting device.

Light emitted from the light source 22 is diffused in a side direction through the gap between the reflection layer 23 and the transmission regulation layer 15. The diffused light is emitted in an upper direction through the pattern of the holes 151. As such, the area between the reflection layer 23 and the transmission regulation layer 15 is defined by a light-guide layer 24.

The light-guide layer 24 may be formed by a spacer 25 enabling a predetermined gap between the reflection layer 23 and the transmission regulation layer 15 to be maintained.

That is, the spacer 25 functions to maintain the distance between the transmission regulation layer 15 and the light source 22 and extends to a height corresponding to a designed height of the light-guide layer 24 and a length corresponding to a length of the reflection layer 23.

The spacer 25 is formed of a material such as polycarbonate (PC), polymethyl methacrylate (PMMA), glass, a resin, phenyl propanol amine (PPA) or aluminum (Al) and thus exhibits light transmission, refraction or reflection.

In addition, the spacer 25 may be mounted by applying an adhesive to the upper and lower surfaces of the spacer 25 and performing UV curing or thermal curing.

In addition, optical sheets such as a diffusion layer 11, a lower polarizing plate 12, a color filter substrate 13 and an upper polarizing plate 14 may be disposed on the transmission regulation layer 15.

Meanwhile, the circuit substrate 21 may be fixed to the mount groove 161 of the lower cover 16 by applying an adhesive 17 to a lower surface of the circuit substrate 21 and a lower surface of the reflection layer 23. In addition, the reflection layer 23 may be fixed to the circuit substrate 21.

Figure 2:
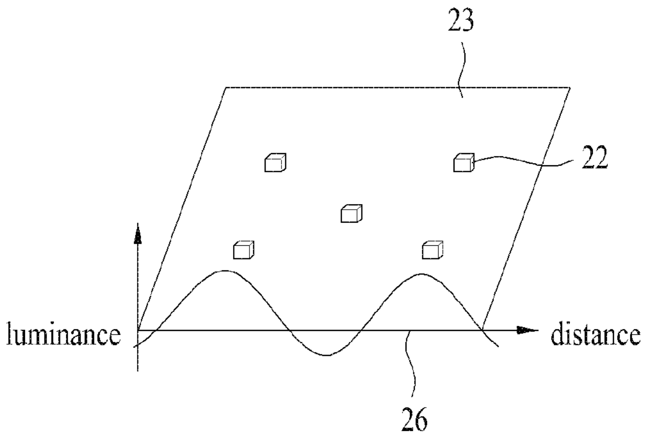
FIGS. 2 and 3 are schematic views illustrating distribution of luminance at an edge of a reflection surface according to position of light sources.
Figure 3:
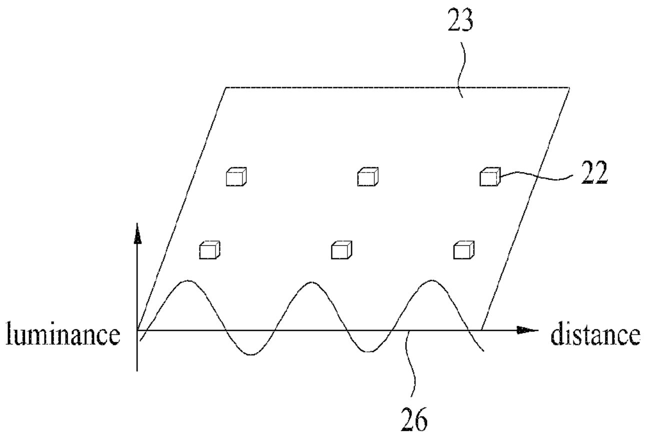

FIGS. 2 and 3 are schematic views illustrating distribution of luminance at an edge of a reflection surface according to position of light sources.

As described above, in a direct-type planar lighting device, a combination of light emitted from the light sources 22 is emitted in the center of the surface on which the light sources 22 are distributed. Accordingly, luminance of the planar lighting device can be uniformized using the optical sheets 11, 12, 13 and 14 described above.

The surface on which the light sources 22 are distributed may be a surface of the circuit substrate 21 or an upper surface of the reflection layer 23 disposed on the circuit substrate 21. Hereinafter, the following description is provided under the assumption that the surface on which the light sources 22 are distributed is the upper surface (reflection surface) of the reflection layer 23.

Meanwhile, difference in luminance between areas close to the light source 22 and areas far from the light source 22 may be generated at an edge 26 in which distribution of the light source 22 is completed.

For example, as can be seen from FIGS. 2 and 3, as the disposition of the light source 22 is changed, luminance difference may be generated according to the distance from the light source 22 at the edge 26 of the light source 22.

That is, in a direct-type lighting device, luminance is high at the position close to the light source 22 and luminance is low at the position far from the light source 22 at an edge 26 of the upper surface of the reflection layer 23.

Figure 4:
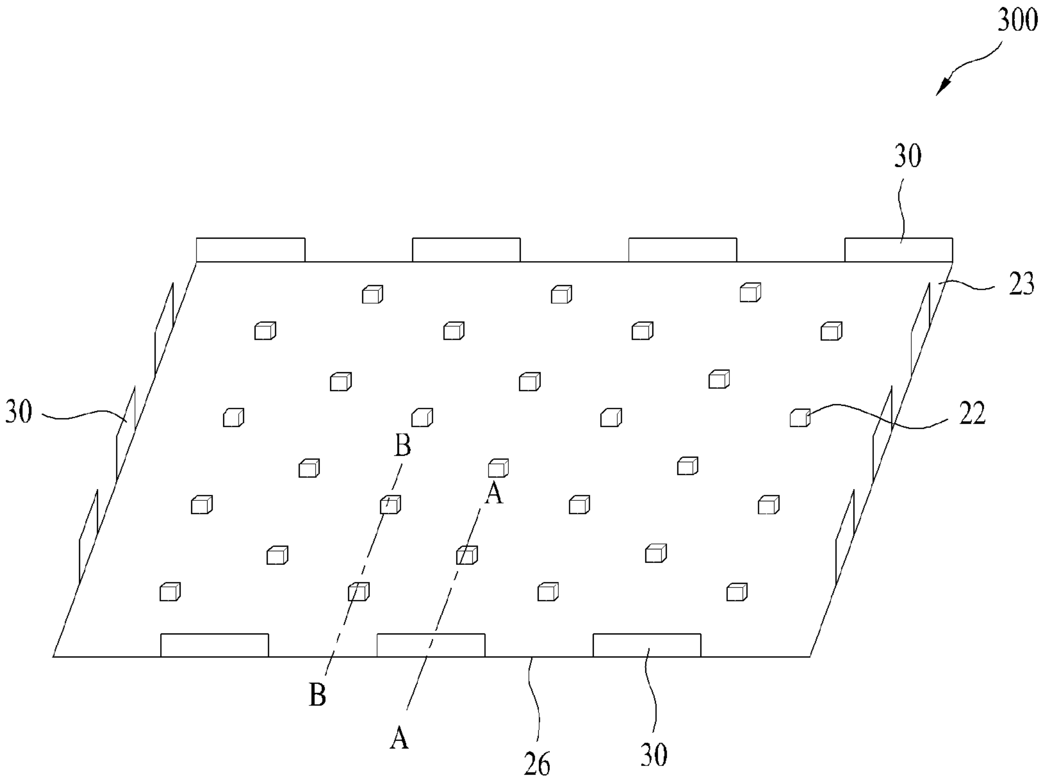
FIG. 4 is a schematic perspective view illustrating a first example of a planar lighting device including a light regulator.

Accordingly, as shown in FIG. 4, preferably, a light regulator 300 for regulating luminance difference caused by distance difference between the light source 22 and the edge 26 may be provided.

The light regulator 300 regulates luminance difference which may occur between the reflection layer 23 and the edge 26. That is, uniformity of luminance can be improved at the edge 26.

Accordingly, when such a light regulator 300 is provided, light emitted from the light sources 22 may be more uniform. More preferably, more uniform lighting can be implemented with the transmission regulation layer 15 having the pattern of holes 151 and the optical sheets 11, 12, 13 and 14 disposed on the reflection layer 23 and the light source 22.

As an example, the light regulator 300 may include a plurality of reflectors 30 for reflecting light emitted from the light sources 22 to an inside of an area formed by the reflection layer 23, disposed at the edge 26 of the reflection layer 23.

For example, the reflectors 30 are disposed in portions of the edge 26 farther from the light sources 22 so that the reflectors 30 reflect light travelling toward the edge 26 and thus focus surrounding light upon relatively dark regions, thereby regulating luminance uniformity.

As shown in FIG. 4, the reflectors 30 may be discontinuously disposed at the edge 26 in the positions relatively far from the light sources 22. That is, the reflectors 30 with a predetermined width may be discontinuously disposed along the edge 26 in the positions farther from the light sources 22.

In addition, from another point of view, the reflectors 30 may be discontinuously disposed in portions of the edge corresponding to areas between adjacent light sources 22 close to the edge 26. That is, the reflectors 30 with a predetermined width may be disposed in portions of the edge corresponding to areas between two light sources 22 close to the edge 26.

Figure 5:
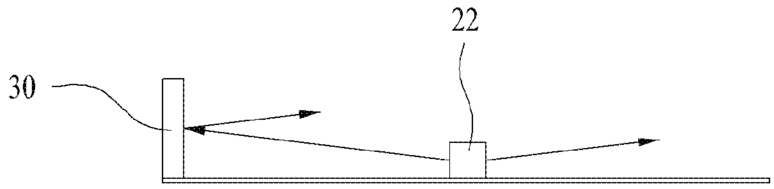
FIG. 5 is a schematic view illustrating traveling of light seen from the cross-section taken along the line A-A of FIG. 4.
Figure 6:
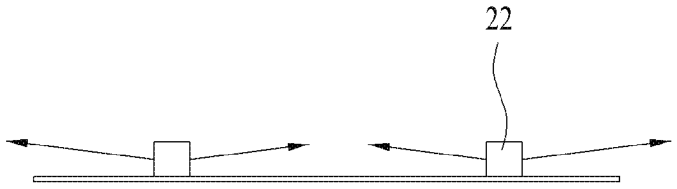
FIG. 6 is a schematic view illustrating traveling of light seen from the cross-section taken along the line B-B of FIG. 4.

FIG. 5 shows traveling of light seen from the cross-section taken along the line A-A of FIG. 4, and FIG. 6 shows traveling of light seen from the cross-section taken along the line B-B of FIG. 4. In addition, FIG. 7 is a schematic view illustrating an example of luminance regulation by the reflector 30.

As shown in FIG. 5, the reflector 30 is disposed in a portion of the edge 26 in the position farther from the light source 22 so that light emitted from the light source 22 is reflected through the reflector 30 and brightness of area which may be dark due to great distance from the light source 22 are thus reinforced.

In a portion of the edge 26 in the position closer to the light source 22, light travels without being reflected in the portion of the edge 26 to prevent the area from becoming brighter and thereby regulate luminance, as shown in FIG. 6.

Figure 7:
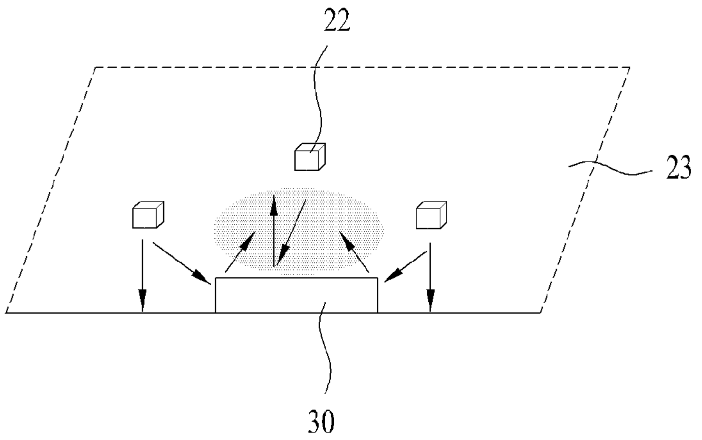
FIG. 7 is a schematic view illustrating an example of luminance regulation by the light regulator.

In addition, as shown in FIG. 7, light emitted from the light source 22 close to the edge 26 is also reflected by the reflector 30 and travels toward areas farther from the light source 22. Accordingly, such a reflector 30 uniformizes luminance of the light sources 22 close to the edge 26 and of the light sources 22 far from the edge 26.

Figure 8:
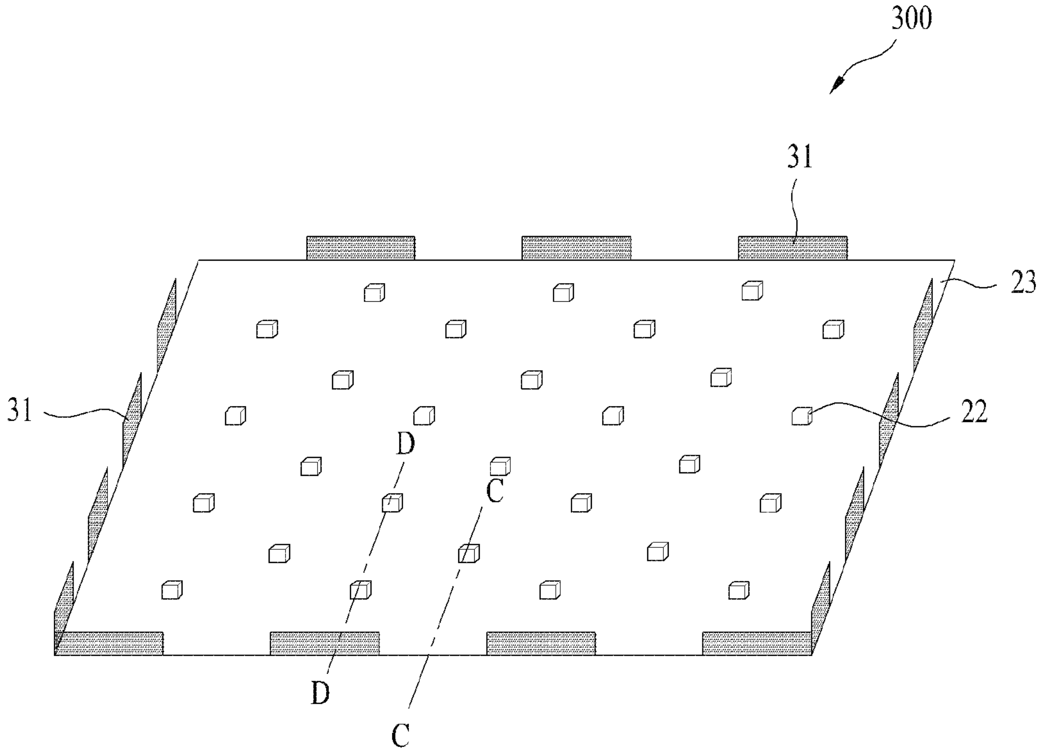
FIG. 8 is a schematic perspective view illustrating a second example of a planar lighting device including a light regulator.

As shown in FIG. 8, as another example, the light regulator 300 includes a plurality of absorbers 31 for absorbing light emitted from the light source 22. The absorbers 31 may be disposed at the edge 26 in positions corresponding to the light sources 22 close to the edge 26.

Such an absorber 31 is close to the light source 22 and absorbs light of areas brighter than neighboring areas to darken the brighter areas and thereby regulate luminance uniformity.

As shown in FIG. 8, the absorbers 31 may be discontinuously disposed close to the light sources 22 at the edge 26. That is, the absorbers 31 with a predetermined width may be discontinuously disposed along the edge 26 in positions relatively close to the light sources 22.

Figure 9:
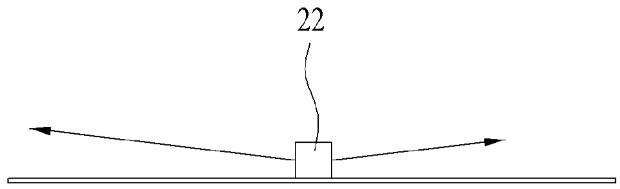
FIG. 9 is a schematic view illustrating traveling of light seen from the cross-section taken along the line C-C of FIG. 8.
Figure 10:
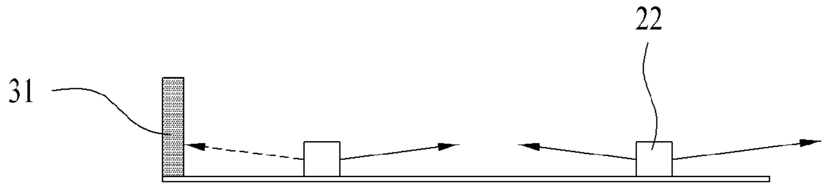
FIG. 10 is a schematic view illustrating traveling of light seen from the cross-section taken along the line D-D of FIG. 8.

FIG. 9 shows traveling of light seen from the cross-section taken along the line C-C of FIG. 8, and FIG. 10 shows traveling of light seen from the cross-section taken along the line D-D of FIG. 8. In addition, FIG. 11 is a schematic view illustrating an example of luminance regulation by the absorber 31.

As shown in FIG. 9, in a portion of the edge 26 in the position farther from the light source 22, light travels without being reflected in the portion of the edge 26, thereby regulating luminance.

As shown in FIG. 10, the absorber 31 is disposed along the edge in the position of the edge 26 close to the light source 22 so that light emitted from the light source 22 is absorbed in the absorber 31 without being reflected or passing through the absorber and brightness of areas which may be relatively bright due to small distance from the light source 22 are thus reduced.

Figure 11:
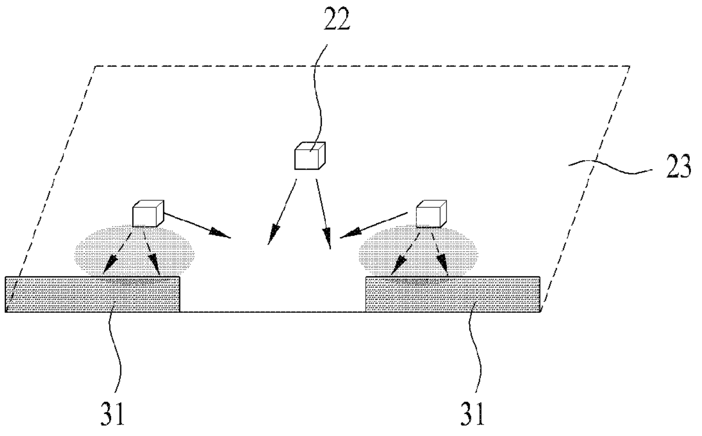
FIG. 11 is a schematic view illustrating an example of luminance regulation by the light regulator.

In addition, as shown in FIG. 11, as described above, light emitted from the light source 22 close to the edge 26 is absorbed in the absorber 31 and light emitted from the light source 22 far from the edge 26 passes through the absorber 31 without being absorbing therein. Accordingly, the absorber 31 contributes to luminance uniformity of the light sources 22 close to the edge 26 and of the light sources 22 far from the edge 26.

Figure 12:
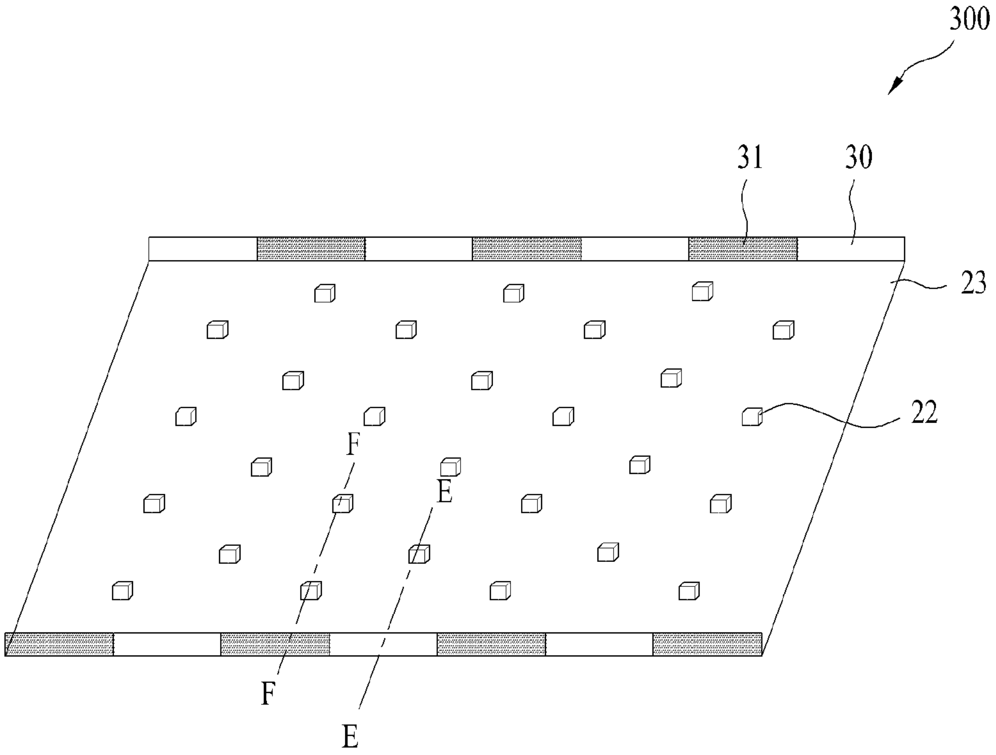
FIG. 12 is a schematic perspective view illustrating a third example of a planar lighting device including a light regulator.

As shown in FIG. 12, the light regulator 300 includes a plurality of reflectors 30 and a plurality of absorbers 31 which are alternately disposed, as another example of the light regulator 300.

That is, the light regulator 300 may include the reflectors 30 for reflecting light emitted from the light sources 22 to an inside of the reflection layer 23 and absorbers 31 being disposed between the reflectors 30 and absorbing light emitted from the light sources 22.

As such, the reflectors 30 and the absorbers 31 alternate with each other and the light regulator 300 may be continuously disposed along an edge 26 of at least one side of the reflection layer 23.

Although FIG. 12 illustrates an example in which the reflectors 30 and the absorbers 31 are provided in edges of upper and lower sides of a transmission regulation layer 23 for convenience, the reflectors 30 and the absorbers 31 may be provided in edges of left and right sides thereof.

As shown in the drawing, the reflectors 30 having a predetermined width may be disposed along the edge 26 in positions of portions of the edge 26 far from the light sources 22 and the absorbers 31 having a predetermined width may be disposed along the edge 26 in positions of portions of the edge 26 close to the light source 22.

Each reflector 30 and each absorber 31 may have the same width. However, in some cases, the width of the reflector 30 may be greater than that of the absorber 31 and vice versa.

Figure 13:
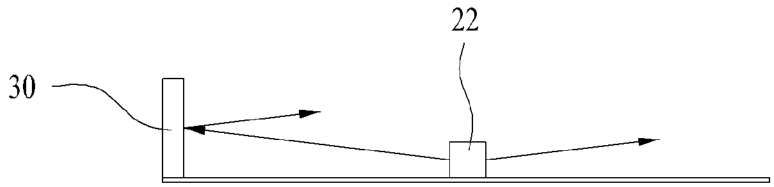
FIG. 13 is a schematic view illustrating traveling of light seen from the cross-section taken along the line E-E of FIG. 12.
Figure 14:
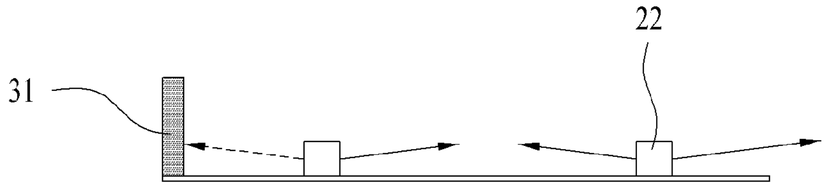
FIG. 14 is a schematic view illustrating traveling of light seen from the cross-section taken along the line F-F of FIG. 12.

FIG. 13 shows traveling of light seen from the cross-section taken along the line E-E of FIG. 12, and FIG. 14 shows traveling of light seen from the cross-section taken along the line F-F of FIG. 12. In addition, FIG. 15 is a schematic view illustrating an example of luminance regulation by the reflector 30 and the absorber 31.

As shown in FIG. 13, the reflector 30 is disposed along the edge in the position of a portion of the edge 26 far from the light source 22 so that light emitted from the light source 22 is reflected by the reflector 30 and brightness of areas which may be relatively dark due to great distance from the light source 22 is thus reinforced.

The absorber 31 is disposed in a portion of the edge 26 close to the light source 22, as shown in FIG. 14, so that light emitted from the close light source 22 is absorbed in the absorber 31 and luminance of areas which may be relatively bright is thus regulated.

Figure 15:
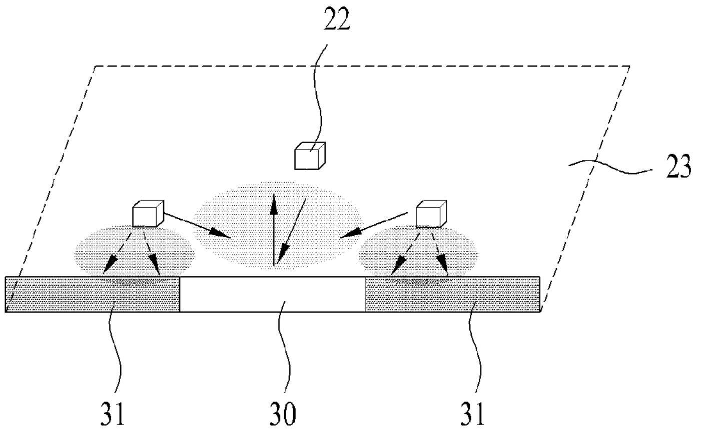
FIG. 15 is a schematic view illustrating an example of luminance regulation by the light regulator.

In addition, as shown in FIG. 15, light emitted from the light source 22 close to the edge 26 may be absorbed in the absorber 31 and light emitted from the light source 22 far from the edge 26 is reflected by the reflector 30. Light emitted from the light source 22 close to the edge 26 is reflected by the reflector 30 and luminance of areas which may be relatively dark is thus regulated.

That is, the reflector 30 and the absorber 31 regulate light emitted from the light sources 22 close to the edge 26 and light emitted from the light sources 22 far from the edge 26, thus contributing to luminance uniformity.

Figure 16:
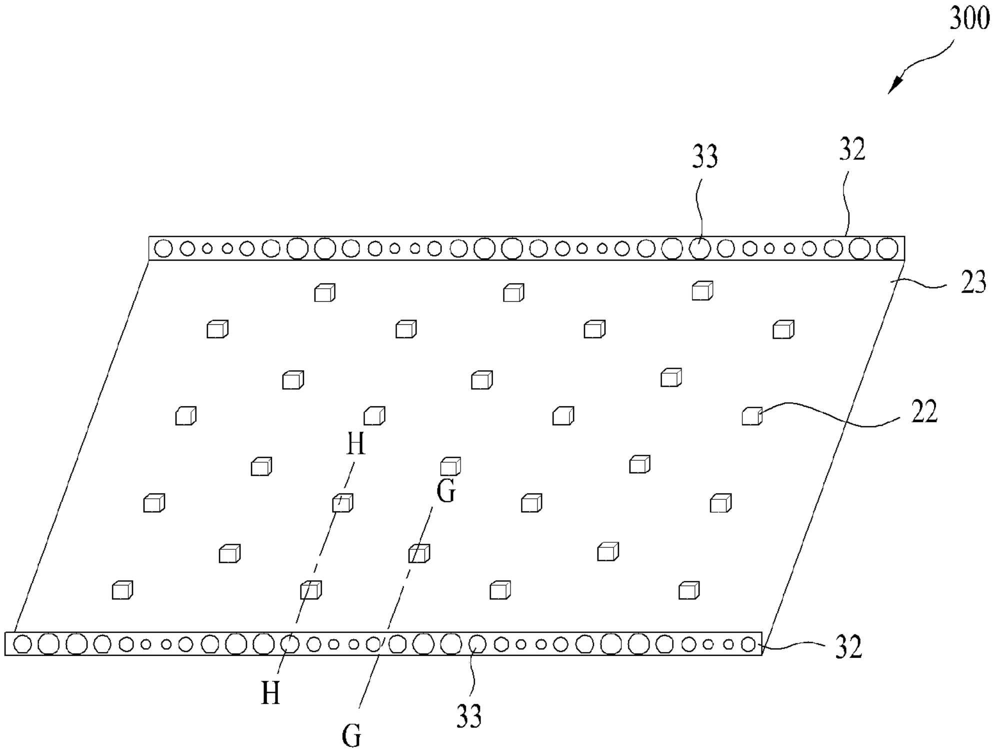
FIG. 16 is a schematic perspective view illustrating a fourth example of a planar lighting device including a light regulator.

As shown in FIG. 16, as another example of the light regulator 300, the light regulator 300 includes a reflection layer 32 disposed along the edge 26 and a plurality of through holes 33 provided in the reflection layer 32.

Although FIG. 16 illustrates an example in which the reflection layer 32 and the through holes 33 are provided in edges of upper and lower sides of the transmission regulation layer 23 for convenience, the reflection layer 32 and the through holes 33 may be provided in edges of left and right sides thereof.

As shown in FIG. 16, the through holes 33 may change in size according to position relative to the light source 22.

That is, larger through holes 33 are disposed in areas closer to the light source 22 and small through holes are disposed in areas far from the light source 22.

In addition, the size of the through holes 33 may be gradually changed. That is, the largest through hole 33 is disposed in an area relatively close to the light source 22, through holes 33 gradually decrease in size, with increasing the distance from the largest through hole and the smallest through hole 33 is disposed in the position farthest from the light source 22.

Figure 17:
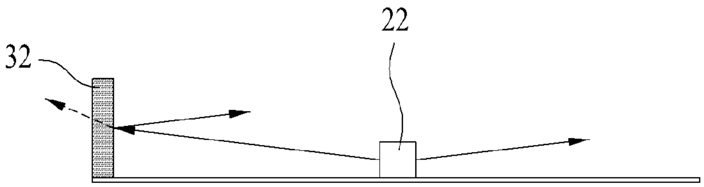
FIG. 17 is a schematic view illustrating traveling of light seen from the cross-section taken along the line G-G of FIG. 16.
Figure 18:
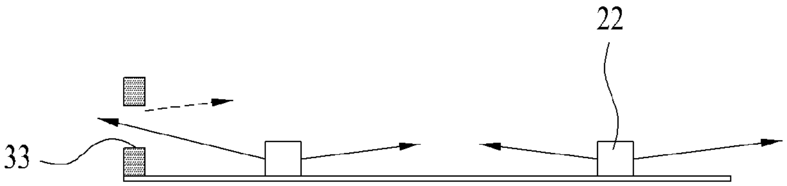
FIG. 18 is a schematic view illustrating traveling of light seen from the cross-section taken along the line H-H of FIG. 16.

FIG. 17 shows traveling of light seen from the cross-section taken along the line G-G of FIG. 16, and FIG. 18 shows traveling of light seen from the cross-section taken along the line H-H of FIG. 16. In addition, FIG. 19 is a schematic view illustrating an example of luminance regulation by the reflection layer 32.

As shown in FIG. 17, the reflection layer 32 having small through holes 33 is disposed in a portion of the edge 26 relatively far from the light source 22 so that a small amount of light emitted from the light source 22 passes through the through holes 33, most thereof is reflected, and brightness of an area which may be relatively dark due to great distance from the light source 22 is thus reinforced.

In addition, a reflection layer 32 having large through holes 33 is disposed in a portion of the edge 26 close to the light source 22, as shown in FIG. 18, so that a great amount of light emitted from the light source 22 passes through the through holes 33 and brightness of an area which may be relatively bright is thus regulated.

Figure 19:
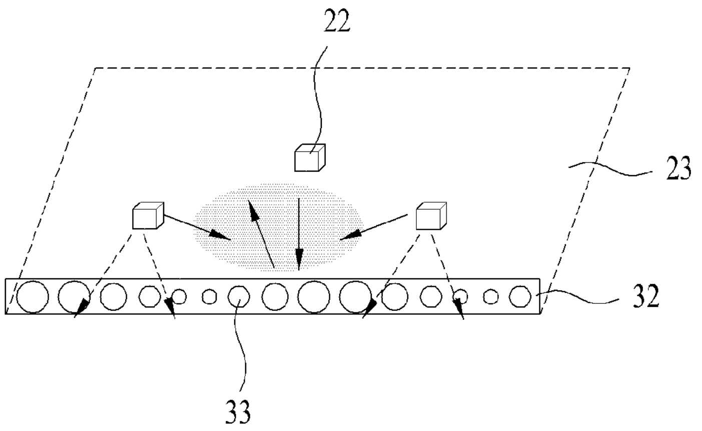
FIG. 19 is a schematic view illustrating an example of luminance regulation by the light regulator.

FIG. 19 is a schematic view illustrating travelling of light by the reflection layer 32 having through holes 33 with various sizes.

That is, some of light emitted from the light source 22 close to the edge 26 passes through large through holes 33 and the remaining thereof is reflected by a portion of the reflection layer 32 in which small through holes 33 are disposed, thereby regulating luminance of areas which may be relatively dark.

In addition, as most of light emitted from light source 22 far from the edge 26 is reflected by the reflection layer 32, luminance of areas, which may be relatively dark, is regulated and luminance uniformity can be thus improved.

Figure 20:
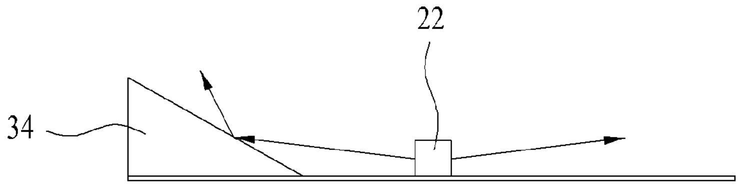
FIGS. 20 to 23 are sectional views illustrating examples of a reflection plate.

Meanwhile, the reflector 30 or the reflection layer 32 described above is shown as a form such as thin wall, but may be provided with a reflection plate 34 whose cross-section has an inclined surface having a polygonal shape, as shown in FIG. 20.

That is, as shown in FIG. 20, a reflection plate 34 whose cross-section has an inclined surface having a right-angled triangle shape is formed so that light emitted from the light source 22 travels upward.

Figure 21:
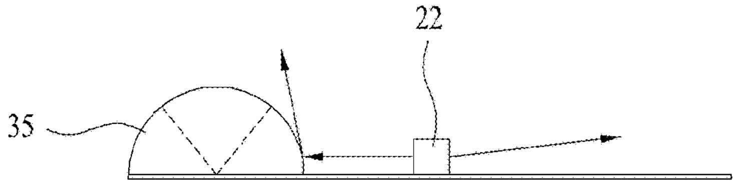

In addition, regarding the shape for reflection, a reflection plate 35 whose cross-section has a curved surface having a semi-spherical or circular arc shape may be formed, as shown in FIG. 21. In some cases, the reflection plate 35 may have an oval curved surface.

Figure 22:
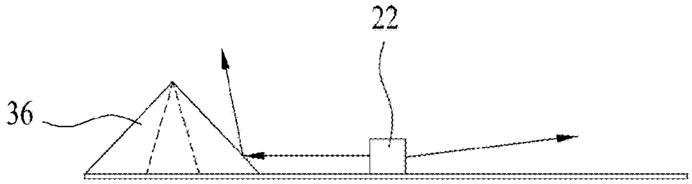
Figure 23:
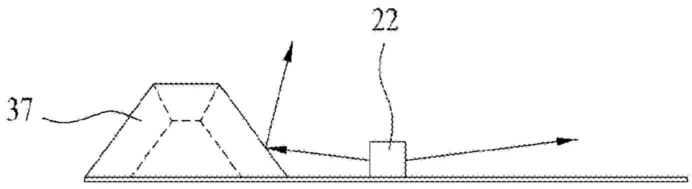

That is, a reflection plate 36 whose cross-section has an inclined surface having a triangle shape is formed, as shown in FIG. 22, and a reflection plate 37 whose cross-section has an inclined surface having a trapezoidal shape is formed, as shown in FIG. 23.

The reflection plate 37 reflects at least part of light emitted from the light source 22 toward the upper surface of the reflection layer 23 and reflects the remaining light into an inside of an area formed by the reflection layer 23.

The reflection plates 34, 35, 36 and 37 having various shapes may be applied to the shape of the reflector 30 or the reflection layer 32 described above.

Meanwhile, the absorption layer 31 described above may be also formed as one of shapes that are the same as the reflection plates 34, 35, 36 and 37.

Figure 24:
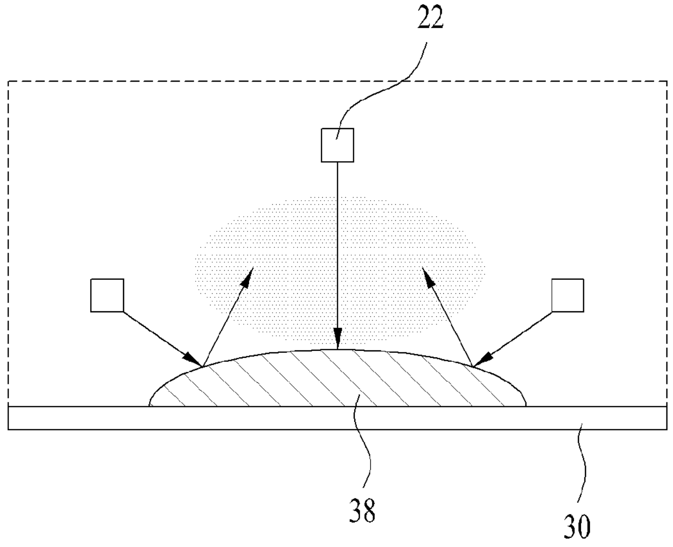
FIGS. 24 and 25 are sectional views illustrating examples of a reflection structure.
Figure 25:
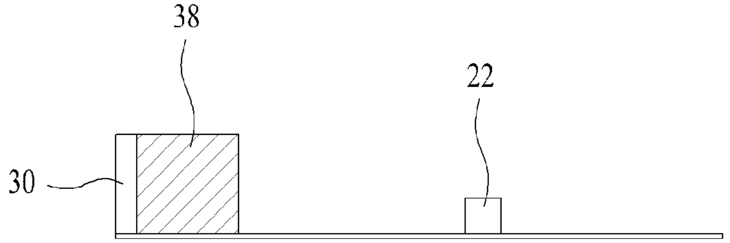

As shown in FIG. 24, in a portion of the edge 26 in the position far from the light source 22, a reflection structure 38 for reducing the distance between the edge and the light source 22 may be provided.

That is, in the portion of the edge 26 far from the light source 22, the distance between the edge and the light source 22 is reduced using the reflection structure 38 and surrounding light is transferred to dark areas and luminance uniformity can thus be regulated.

The reflection structure 38 may be formed of a highly reflective material. FIG. 24 shows the reflection structure 38 having an oval portion, but the shape of the reflection structure 38 may be selected from a variety of shapes such as curved shapes including circular or circular arc shapes, and triangular or trapezoidal shapes.

Figure 26:
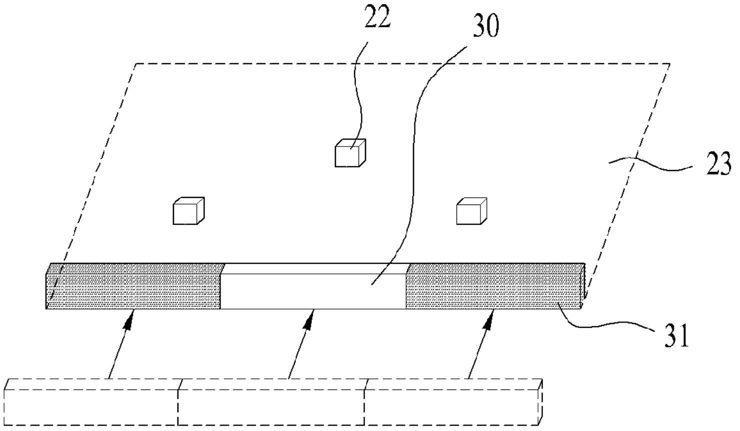
FIGS. 26 and 27 are schematic perspective views illustrating examples of configurations of the light regulator.

Regarding the light regulator 300 including the reflector 30, the absorber 31 and the reflection plate 32 described above, another light regulator 300 newly produced is bonded to the edge 26 of the light regulator 300, as shown in FIG. 26.

For example, as shown in FIG. 26, reflectors 30 and absorbers 31 which alternate with each other are produced as separate structures and are then bonded to the edge 26.

Figure 27:
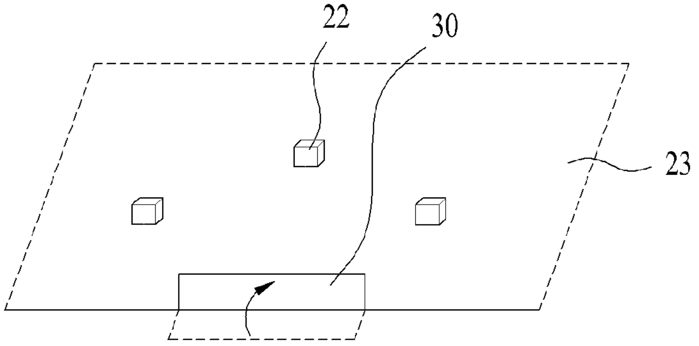

In addition, as shown in FIG. 27, a surface of the reflection layer 23 may be bent in an inside direction to constitute the reflector 30.

That is, the reflection layer 23 is produced such that it has a portion serving as the reflector 30 and the portion is bent to constitute the reflector 30.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device comprising:

a lower cover;

a liquid crystal panel; and a backlight unit disposed between the liquid crystal panel and the lower cover and providing light to the liquid crystal panel, wherein the backlight unit comprises:

a circuit substrate disposed on an upper surface of the lower cover;

a first adhesive disposed between a lower surface of the circuit substrate and the upper surface of the lower cover;

a light source mounted on an upper surface of the circuit substrate; and a reflection layer disposed on the circuit substrate, and wherein the first adhesive overlaps the light source in a vertical direction.

2. The display device of claim 1, wherein a width of the first adhesive is smaller than a width of the circuit substrate.

3. The display device of claim 1, wherein a width of the first adhesive is larger than a width of the light source.

4. The display device of claim 1, further comprising a second adhesive disposed between the circuit substrate and the reflection layer, wherein the second adhesive is positioned laterally of the light source.

5. The display device of claim 4, further comprising a third adhesive disposed between the circuit substrate and the reflection layer, and wherein the first adhesive is positioned between the second adhesive and the third adhesive.

6. The display device of claim 1, wherein the reflection layer includes a plurality of through holes at the edge.

7. The display device of claim 6, wherein the plurality of through holes are formed at one edge and an opposite edge of the reflection layer.

8. The display device of claim 6, wherein the edge of the reflection layer is bent upward.

9. The display device of claim 6, wherein the plurality of through holes have a circular shape.

10. The display device of claim 1, further comprising an optical layer at a top of the light source, wherein the optical layer includes resin.

11. The display device of claim 1, wherein the light source includes a blue LED and yellow phosphor.

12. The display device of claim 1, further comprising:

an optical sheet disposed on the light source; and a spacer maintaining a gap between the reflection layer and the optical sheet.

13. A back light unit comprising:

a circuit substrate disposed on an upper surface of a lower cover of a display panel;

a first adhesive disposed between a lower surface of the circuit substrate and the upper surface of the lower cover;

a light source mounted on an upper surface of the circuit substrate; and a reflection layer disposed on the circuit substrate, wherein the first adhesive overlaps the light source in a vertical direction.

14. A display device comprising:

a lower cover;

a liquid crystal panel; and a backlight unit disposed between the liquid crystal panel and the lower cover and providing light to the liquid crystal panel, wherein the backlight unit comprises:

a circuit substrate disposed on an upper surface of the lower cover;

a first adhesive disposed between a lower surface of the circuit substrate and the upper surface of the lower cover;

a light source mounted on an upper surface of the circuit substrate; and a reflection layer disposed on the circuit substrate, wherein the reflection layer includes a plurality of through holes at the edge.

15. The display device of claim 14, wherein the plurality of through holes are formed at one edge and an opposite edge of the reflection layer.

16. The display device of claim 14, wherein the edge of the reflection layer is bent upward.

17. The display device of claim 14, wherein the plurality of through holes have a circular shape.

* * * * *